United States Patent Office.

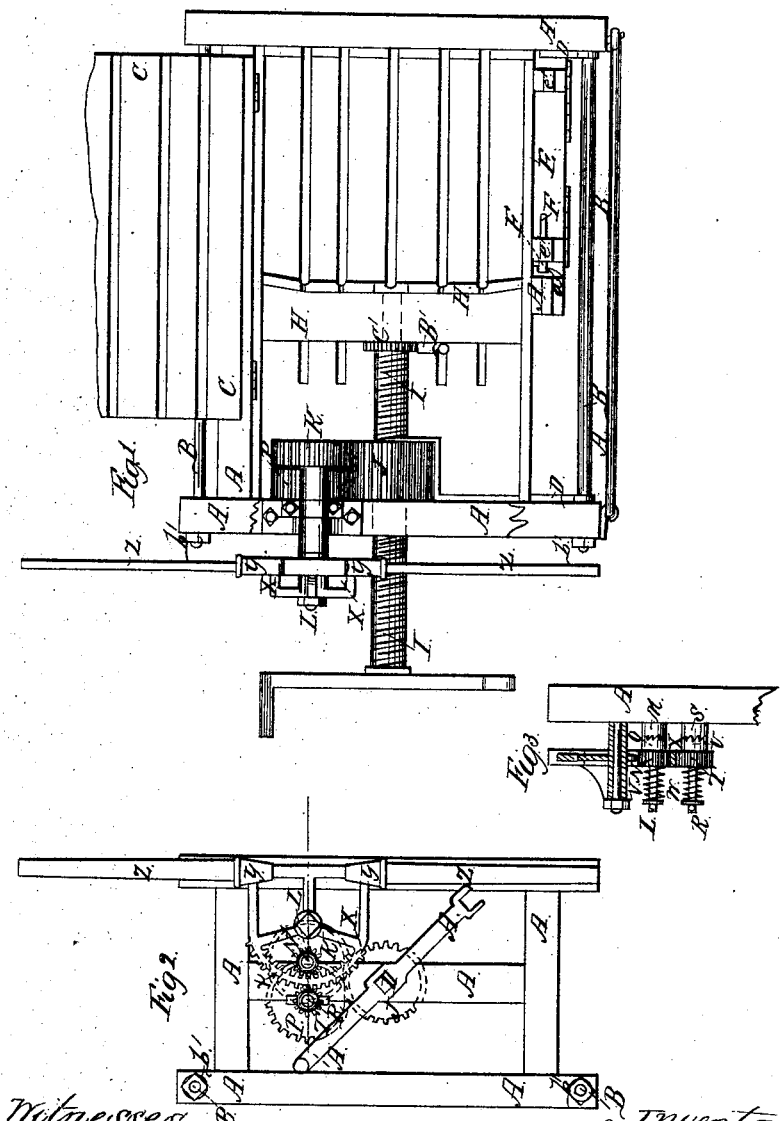

THOMAS D. GUTHRIE, JR., OF GALVA, ILLINOIS.

Letters Patent No. 69,657, dated October 8, 1867.

---

IMPROVED BALING-PRESS.

---

The Schedule referred to in these Letters Patent and making part of the same.

---

TO ALL WHOM IT MAY CONCERN:

Be it known that I, THOMAS D. GUTHRIE, Jr., of Galva, in the county of Henry, and State of Illinois, have invented a new and improved Baling-Press; and I do hereby declare that the following is a full, clear, and exact description thereof, which will enable those skilled in the art to make and use the same, reference being had to the accompanying drawings, forming part of this specification, in which—

Figure 1 is a top view of my improved press, the top being raised and partly broken away.

Figure 2 is an end view of the same.

Figure 3 is a detail sectional view taken through the line $x\ x$, fig. 2.

Similar letters of reference indicate corresponding parts.

My invention has for its object to furnish an improved press, designed especially for baling broom-corn, but equally applicable for baling other substances, which shall be simple in construction, easily operated, and efficient in operation; and it consists in the combination and arrangement of the operating parts of the machine, as hereinafter more fully described.

A is the frame of the machine, which is strengthened by the long iron bolts or rods B, which are secured in place by nuts $b'$, with the exception of the upper front rod, which is pivoted to the frame A at one end, and the other end hooks upon a strong catch or hook attached to the said frame A. C is the top or cover of the press, which is hinged to the frame A, and which is secured in place when closed by strong hooks, D, pivoted to the frame A, and which hook upon the frame of the said cover or door. E is a small door, formed in the side of the press, where the compressed bale is formed, for convenience in removing it. The vertical timbers of the door E have tenons, $e'$, formed upon them, which enter mortises in the frame of the door or cover C, to hold the door securely in place while the machine is being operated. The door E is also held, when closed, by a spring-latch, F, which takes hold of the catch G, attached to the frame A of the machine. H is the follower or plunger, which is attached to the inner end of the screw I in such a way that the said screw, while free to turn, will carry the said plunger back and forward with it. The screw I passes out through a nut formed or placed in the gear-wheel J, pivoted to the frame A, and its end is squared off for the reception of a crank, to move the follower H back and forth when little power is required. K is a gear-wheel, attached to the end of the shaft L, and the teeth of which mesh into the teeth of the gear-wheel J. The shaft L revolves in bearings attached to the frame A, and has a clutch, M, formed upon or attached to its upper end, as shown in fig. 3. N is a gear-wheel, revolving upon the upper end of the shaft L, and having a clutch, O, formed upon the inner end of its hub, which, when the wheel N is turned in one direction, takes hold of the clutch M, so as to revolve the shaft L and force the screw I inward; but when the wheel N is revolved in the other direction, the clutch O slides over the clutch M without taking hold of it. P is a gear-wheel, attached to the lower end of the shaft R, and the teeth of which mesh into the teeth of the gear-wheel J. The shaft R revolves in bearings in the frame A, and has a clutch, S, formed upon or attached to its outer part. T is a gear-wheel, revolving loosely upon the outer end of the shaft R, and having a clutch, U, formed upon the inner end of its hub, which, when the wheel T is revolved in one direction, takes hold of the clutch S and revolves the shaft R, forcing the screw I inward; but when the wheel T is revolved in the other direction, the clutch U slides over the clutch S without taking hold of it. The wheels N and T are held down to their places by the coiled springs V and W, as shown in fig. 3. X is a segment, having teeth formed upon its concave and convex sides. The segment X passes between the gear-wheels T and N, its exterior teeth meshing into the teeth of the wheel T, and its interior teeth meshing into the teeth of the wheel N. The segment X is pivoted to the frame A, and its ends are extended upward, and have sockets Y attached to them for the reception of the bars or levers Z, by which the machine is operated. The sockets Y are rigidly connected to each other and to the hub of the segment X, as shown in fig. 2.

By this construction and arrangement of the gearing the screw I will be forced inward, compressing the bale, when the levers Z are moving in both directions, so that the advance of the plunger may be continuous. The inner surface of the chamber in which the bale is compressed is grooved or slotted, for the reception of the hoops by which the bale is secured, the ends of which, when the bale has been sufficiently compressed, may be secured either by opening the cover C, or by passing the ends of the hoops through the slots in the end of the machine. The screw I is run out and the follower H withdrawn by means of the crank A', which may also be used for forcing the follower inward until more power is required than can be exerted in that way, the compression of the bale being completed by operating the levers Z. The screw I is kept from being forced back, by the resistance of the material being compressed, by the pawl B', pivoted to the follower H, and taking hold of a ratchet-wheel, C', attached to or formed upon the screw I, as shown in fig. 1.

I claim as new, and desire to secure by Letters Patent—

The combination of the follower H, screw I, gear-wheels J K P, shafts L R, clutches M O and S U, gear-wheels N T, and segment X, having external and internal teeth, and provided with sockets Y for the reception of the levers Z, with each other and with the frame of the press, substantially as herein shown and described, and for the purpose set forth.

THOMAS D. GUTHRIE, Jr.

Witnesses:
    J. ROSENTHAL,
    C. E. DAVIS.